US008916819B2

(12) United States Patent
Makarov et al.

(10) Patent No.: US 8,916,819 B2
(45) Date of Patent: Dec. 23, 2014

(54) METHOD AND APPARATUS FOR IMPROVING THE THROUGHPUT OF A CHARGED PARTICLE ANALYSIS SYSTEM

(75) Inventors: Alexander Makarov, Bremen (DE); Anastassios Giannakopulos, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 13/876,794

(22) PCT Filed: Sep. 29, 2011

(86) PCT No.: PCT/EP2011/066986

§ 371 (c)(1), (2), (4) Date: Mar. 28, 2013

(87) PCT Pub. No.: WO2012/041963

PCT Pub. Date: Apr. 5, 2012

(65) Prior Publication Data

US 2013/0221216 A1 Aug. 29, 2013

(30) Foreign Application Priority Data

Oct. 1, 2010 (GB) .................................. 1016524.9

(51) Int. Cl.
*B01D 59/44* (2006.01)
*H01J 49/06* (2006.01)
*H01J 49/00* (2006.01)

(52) U.S. Cl.
CPC ........... *H01J 49/0027* (2013.01); *H01J 49/062* (2013.01); *H01J 49/06* (2013.01); *H01J 49/0031* (2013.01)
USPC .......................................... 250/282; 250/281

(58) Field of Classification Search
None
See application file for complete search history.

(56) References Cited

U.S. PATENT DOCUMENTS 7,145,133 B2 * 12/2006 Thomson ...................... 250/281
7,189,967 B1 * 3/2007 Whitehouse et al. ......... 250/292
7,737,396 B2 * 6/2010 Chernushevich et al. .... 250/287
7,960,694 B2 * 6/2011 Hoyes .......................... 250/292

FOREIGN PATENT DOCUMENTS

WO 2010136533 A1 12/2010

OTHER PUBLICATIONS

Hu et al. ("The Orbitrap: a New Mass Spectrometer," J. of Mass Spec., Wiley, Chichester, GB, No. 40, Apr. 1, 2005, pp. 430-434.*
Hu et al., "The Orbitrap: a New Mass Spectrometer," J. of Mass Spec., Wiley, Chichester, GB, No. 40, Apr. 1, 2005, pp. 430-434.

* cited by examiner

*Primary Examiner* — Andrew Smyth
(74) *Attorney, Agent, or Firm* — Charles B. Katz

(57) ABSTRACT

A method of increasing ion throughput within an accumulator, an energy lift and a pulsed ion extractor, operated in that order upon a batch of ions, comprising the steps of: firstly loading a batch of ions into the accumulator; secondly changing the electrical potential of the energy lift to raise the energy of the batch of ions contained therein; and thirdly ejecting the batch of ions from the pulsed ion extractor; and wherein: the energy lift is a separate device from the accumulator and the pulsed ion extractor, and whilst changing the electrical potential in the second step a fresh batch of ions is loaded into the accumulator and/or a previous batch of ions is prepared for ejection in the pulsed ion extractor; or the energy lift is incorporated into the pulsed ion extractor and whilst changing the electrical potential in the second step a fresh batch of ions is loaded into the accumulator; or the energy lift is incorporated into the accumulator and whilst changing the electrical potential in the second step a previous batch of ions is prepared for ejection in the pulsed ion extractor. A charged particle analyzer system is also provided.

16 Claims, 7 Drawing Sheets

METHOD AND APPARATUS FOR IMPROVING THE THROUGHPUT OF A CHARGED PARTICLE ANALYSIS SYSTEM

FIELD OF THE INVENTION

This invention relates to the field of mass spectrometry; more specifically to the improvement of throughput of a charged particle transport system during the process of preparing of a packet of charged particles for introduction into a mass analyzer.

BACKGROUND

Some types of mass spectrometer require charged particles (typically ions) to be injected as a packet into a mass analyzer at elevated kinetic energies such as keV to facilitate high mass resolution operation. Examples include electrostatic trap (EST) and time of flight (TOF) mass spectrometers. In addition, typically these types of mass spectrometers, in common with some others, utilise charged particle detectors which convert incoming ions to electrons by physical processes which depend to some extent upon the velocity of the incoming particles. For efficient conversion, ions should impinge upon a detector surface with sufficiently high velocity. Such detectors can suffer from inefficient conversion characteristics for ions of high mass which, whilst having the same kinetic energy as lower mass ions, have a lower velocity. It is known to be advantageous to accelerate the ions to still higher kinetic energies to overcome this problem. However, where such acceleration occurs after mass analysis, it can have a detrimental effect on TOF mass resolution due to the process of post acceleration introducing temporal aberrations.

In EST and TOF mass spectrometers, the source of ionised particles may be a continuous source, such as electrospray ionisation, operating at atmospheric pressure. Other forms of atmospheric pressure ionisers are well known. Unless the ioniser produces pulses of ions within vacuum, it is normal to have distinctly separate ionisers and pulsed ion sources, the latter producing a packet of ions within vacuum for injection into the mass analyzer, the ions having been created initially by the ioniser. Where the ioniser operates outside the instrument vacuum system, it is advantageous that it operate at or near ground electrical potential to ease design constraints and for safety reasons. Ions produced must then therefore be increased in kinetic energy before injection into the mass analyzer. This has been accomplished in various ways.

In one way, an insulating beam transport element such as a glass capillary is located between the region at atmospheric pressure and an intermediate vacuum region. This type of arrangement is described, for example, in U.S. Pat. No. 5,965,883. The two ends of the capillary are metalized and electrical potentials applied so that the electrospray needle of the ionizer (as used in this example) is able to be maintained at ground potential. In this case a potential at −4500V was applied to the end at or nearest the atmospheric pressure region, and +160V to the end within the intermediate vacuum. The potential difference has a polarity so as to raise ions of a desired polarity to elevated potential relative to a mass analyzer. As such, the electric field within the capillary opposes the flow of ions along the capillary, but the capillary is made sufficiently long and the gas flow within the capillary is made sufficiently high to drive ions along the capillary channel overcoming the relatively weak opposing electric field. A disadvantage of this arrangement is the tendency to electrical breakdown of the gas due to the high potentials applied, and accordingly it has been found impractical to apply more than 4-5kV across the capillary. The result of this is that ions are only able to be raised to relatively low electrical potentials using this type of apparatus.

In another way, as described for example in U.S. Pat. No. 6,057,544, a drift zone consisting of a conductive tube is incorporated into the ion path between the ion source and the analyzer and a voltage is applied to the drift zone, switched between low potential and an accelerating potential of several kV in a shorter time than the time taken for the ions to traverse the tube. This method is unsuitable for raising all ions emitted from a continuous ion source to elevated potential.

In another way, the ions are moved through the instrument to the pulsed ion source, where they are trapped and cooled before injection into the mass analyzer. During the process of injection the electrical potential of a portion of the ion flight path immediately downstream of the pulsed ion source is changed, lifting the ions to an elevated potential as they fly through that portion of the flight path on route from the pulsed ion source to the mass analyzer. An example of such a system is described in U.S. Pat. No. 7,425,699 in relation to FIGS. 6 and 7, in which there is a curved trap and where an EST mass analyzer is used. Here, the ions are stored within the curved trap which forms the pulsed ion source, cooled by collisions with gas at 0.1-1 mTorr and then voltage pulses are applied to electrodes of the curved trap to eject the trapped ions. The curved trap may float at the accelerating potential—but then the ioniser must also be floated, so alternatively a liner is provided between the exit of the curved trap and lenses which precede the EST. Ions enter the liner on their flight path and a voltage pulse is applied to the liner to cause the liner to act as an energy lift. The potential of that portion of the flight path is raised whilst the ions are within the liner, and they emerge to be accelerated towards the mass analyzer which is maintained near ground potential. The curved trap may then also be maintained at or near ground potential, along with the ioniser. This arrangement is disadvantageous in that the liner is a finite length and this must be of sufficient length to contain ions of all the desired mass range as they fly from the pulsed source through the liner whilst the liner is raised to high potential, and this places a restriction on the minimum distance between the pulsed source and the mass analyzer. Ideally the distance between the pulsed source and the mass analyzer is kept as short as possible to reduce the time of flight separation of the packet of ions as they proceed from the pulsed ion source to the mass analyzer as otherwise it may limit the mass resolving power of the mass analyzer.

In a further way, ions are raised to the desired potential within the pulsed ion source at the time of the ejection of the ions. In this approach, the pulsed ion source is rapidly raised to high potential in order to extract the ions. However, pulsing electrodes from near ground potential to several kV to eject ions from the pulsed ion source is difficult because of the short timescale over which the pulse must take place, which may be of the order of ns, and because of the accuracy of the final voltage that must be achieved. The voltage applied must be free from ringing at the hundreds of mV level, or better. This is even more important when radio frequency (RF) pulsed sources are used where the RF and DC potentials are coupled and the RF potential alone must be switched off, complicating the electronic control. The accuracy of the final potential and any ringing of that potential during pulsing can have detrimental effects on the mass accuracy and the mass resolution achievable by the mass analyzer because of the effects they have upon the ion packet. Furthermore, where the accelerating potential is applied across the trap at the time of ejection, a large potential gradient exists within the trap. The spatial distribution of ions within the trap is finite and ions at different positions within the trap experience a different potential and are undesirably accelerated to different energies.

Mass analyzers that utilise packets of ions, such as EST and TOF analyzers, are ideally suited to use ionisers that produce pulsed beams, such as MALDI. However in order for them to utilise continuous beams of ions from sources such as electrospray ionisers, for example, the continuous beam must be sampled in some way. Pulses of ions have been extracted from the continuous beam in some prior art methods. However it is desirable for efficiency reasons to utilise as much of the continuous beam as possible, preferably all the continuous beam, so that desired detection limits may be achieved with the minimum of sample consumption. To accomplish high efficiency utilisation of a continuous ion beam, the beam may be accumulated in a store and accumulated ions formed into a packet for injection into the mass analyzer. Usually the ion beam is cooled by collisions with gas before injection to reduce the energy spread of the ions enabling high mass resolution to be achieved by the mass analyzer, and this may be accomplished in the accumulator, in the pulsed ion source, or both. For highest efficiency it is preferable that the accumulator and pulsed ion source can accommodate the entire output of the ioniser, but this has not yet been achieved for electrospray ionisers.

For some EST analysers, the duty cycle is dominated by the time to obtain high resolution data from the analyser. However high resolution may be obtained from some TOF analysers, for example, such as multi-reflection TOF analysers, in much shorter time periods, the time period being of the order of the time required to lift ions to the required energy for injection, and for these analysers it is especially valuable to be able to lift ions to the desired energy without disrupting the flow of ions through the instrument.

In view of the above, the present invention has been made.

SUMMARY OF THE INVENTION

According to an aspect of the present invention there is provided a method of increasing ion throughput within an accumulator, an energy lift and a pulsed ion source, operated in that order upon a batch of ions, comprising the steps of:

(1) loading a batch of ions into the accumulator;

(2) changing the electrical potential of the energy lift to raise the energy of the batch of ions contained therein;

(3) ejecting the batch of ions from the pulsed ion source; and wherein:

(i) the energy lift is a separate device from the accumulator and the pulsed ion source, and whilst changing the electrical potential in step (2): a fresh batch of ions is loaded into the accumulator and/or a previous batch of ions is prepared for ejection in the pulsed ion source; or (ii) the energy lift is incorporated into the pulsed ion source and whilst changing the electrical potential in step (2) a fresh batch of ions is loaded into the accumulator; or (iii) the energy lift is incorporated into the accumulator and whilst changing the electrical potential in step (2) a previous batch of ions is prepared for ejection in the pulsed ion source.

According to another aspect of the present invention there is provided a method for increasing the throughput of a pulsed ion source, comprising the steps of:

(1) loading a batch of ions into an accumulator;

(2) loading the batch of ions from the accumulator into an energy lift;

(3) changing the electrical potential of the energy lift to raise the energy of the batch of ions whilst at the same time preparing a previous batch of ions for ejection in the pulsed ion source and/or whilst loading a fresh batch of ions into the accumulator;

(4) loading the batch of ions from the energy lift into the pulsed ion source;

(5) ejecting the batch of ions from the pulsed ion source.

According to another aspect of the present invention there is provided a method for increasing the throughput of a pulsed ion source, comprising the steps of:

(1) loading a batch of ions into an accumulator;

(2) changing the electrical potential of the accumulator to raise the energy of the batch of ions whilst at the same time preparing a previous batch of ions for ejection in the pulsed ion source;

(3) loading the batch of ions from the accumulator into the pulsed ion source;

(4) ejecting the batch of ions from the pulsed ion source.

According to another aspect of the present invention there is provided a method for increasing the throughput of a pulsed ion source, comprising the steps of:

(1) loading a batch of ions into an accumulator;

(2) loading the batch of ions from the accumulator into a pulsed ion source;

(3) changing the electrical potential of the pulsed ion source to raise the energy of the batch of ions whilst at the same time loading a fresh batch of ions into the accumulator;

(4) ejecting the batch of ions from the pulsed ion source.

According to another aspect of the invention there is provided a charged particle analyzer system comprising:

an accumulator electrically connected to a first power supply supplying a first electrical potential;

a pulsed ion source electrically connected to a second power supply supplying a second electrical potential, the first and second electrical potentials differing by at least 1 kV;

an energy lift electrically connected to a third power supply for lifting the energy of a batch of ions;

a controller connected to the third power supply and arranged to change the electrical potential of the third power supply from a potential similar to the first potential to a potential similar to the second potential whilst a fresh batch of ions is entering the accumulator and/or whilst a previous batch of ions is being prepared for ejection in the pulsed ion source.

According to another aspect of the present invention there is provided a method for increasing the throughput of a pulsed ion source, comprising the steps of:

(1) loading a batch of ions into an accumulator;

(2) loading the batch of ions from the accumulator into an energy lift;

(3) changing the electrical potential of the energy lift to raise the energy of the batch of ions whilst at the same time loading a fresh batch of ions into the accumulator;

(4) loading the batch of ions from the energy lift into the pulsed ion source;

ejecting the batch of ions from the pulsed ion source.

According to another aspect of the present invention there is provided a method of preparing ions for a TOF mass analyser comprising the steps of: containing a first set of ions within an energy lift; and changing the potential energy of the first set of ions within the energy lift with respect to the TOF mass analyser whilst at the same time accumulating a second set of ions in an ion storage device upstream of the energy lift.

According to another aspect of the present invention there is provided a method of preparing ions for an EST mass analyser comprising the steps of: containing a first set of ions within an energy lift; and changing the potential energy of the first set of ions within the energy lift with respect to the EST mass analyser whilst at the same time accumulating a second set of ions in an ion storage device upstream of the energy lift.

Preferably the charged particles are ions, and herein ions will be referred to as an example of charged particles without excluding other types of charged particles unless the context requires it. A packet of ions comprises a group of ions, the group usually comprising a variety of mass to charge ratios, which is, at least initially, spatially confined.

Ions are created by an ioniser. The ioniser may operate within the vacuum system of the spectrometer or it may operate at atmospheric pressure. Preferably the ioniser operates at substantially atmospheric pressure. Ions that originated in the ioniser are loaded into an accumulator. The loading into the accumulator may occur after other processes have been performed upon the ions, for example including but not limited to mass selection, ion mobility separation, reaction, cooling and fragmentation. Where fragmentation and/or reactions have occurred the ions may therefore be of a different form from those produced by the ioniser.

The accumulator may comprise any type of containment device which is arranged to accept ions and at least temporarily store them whilst accepting further ions. The accumulator may comprise an ion guide comprising a multipole, a stack of rings, a funnel, cells comprising pixels and combinations of such devices, or it may comprise any other type of ion optical guide, trap, store or container. The ions may be held substantially stationary on average whilst being stored, or the ions may be transported along a path within the accumulator whilst being stored. Preferably the accumulator uses electric and/or magnetic fields in order to contain the ions. The electric and/or magnetic fields may be static or time-varying. Preferably the accumulator is an ion trap or an ion guide, more preferably a multipole ion guide. When the accumulator is an ion guide the ion guide may comprise one or more sections. When the accumulator is an ion guide, the ion guide may be substantially straight or may comprise one or more curved sections. Various RF potentials may be applied, such as superimposed RF waveforms as for example described in U.S. Pat. No. 7,375,344, different RF parameters for different mass ranges, different RF parameters for different parts of the ion guide/cell, and various RF plus time-invariant potential combinations. The ion guide/cell may comprise different regions, each of which may be operated at the same or different gas pressures. Preferably the accumulator is a RF electrical multipole ion guide which accepts ions at an entrance and transports the ions to an exit. Preferably the exit is spatially distinct from the entrance. The accumulator may be pressurised with gas in order to cool, react and/or fragment the accumulated ions; accordingly the accumulator is then provided with an enclosure for confining the gas and a gas supply to the enclosure. Preferably the accumulator is pressurised with gas in order to cool the ions. In another preferred embodiment the accumulator is pressurised with gas in order to act as a collision cell, fragmenting ions whilst a prior batch of ions is being lifted in energy by an energy lift located downstream, or whilst a prior batch of ions is prepared for ejection within a pulsed ion source located downstream.

The energy lift may be a separate ion optical assembly located between the accumulator and the pulsed ion source. Alternatively the energy lift may be incorporated into the pulsed ion source. Incorporation into the pulsed ion source includes herein that the function of the energy lift is performed by the same physical device that forms the pulsed ion source. Alternatively still, the energy lift may be incorporated into the accumulator. Incorporation into the accumulator includes herein that the function of the energy lift is performed by the same physical device that forms the accumulator.

Where the energy lift is a separate ion optical assembly, the energy lift may comprise any type of containment device which is arranged to accept ions and at least temporarily store them whilst lifting the ions from one electrical potential to another electrical potential. The energy lift may comprise an ion guide comprising a multipole, a stack of rings, a funnel, cells comprising pixels and combinations of such devices, or any other type of ion optical guide, trap, store or container. The ions may be held substantially stationary on average whilst being stored, or the ions may be transported along a path within the energy lift whilst being stored. Preferably the energy lift uses electric and/or magnetic fields in order to contain the ions. The electric and for magnetic fields may be static or time-varying. Preferably the energy lift is an ion trap or an ion guide, more preferably a multipole ion guide. When the energy lift is an ion guide the ion guide may comprise one or more sections. When the energy lift is an ion guide, the ion guide may be substantially straight or may comprise one or more curved sections. Various RF potentials may be applied, such as superimposed RF waveforms as for example described in U.S. Pat. No. 7,375,344, different RF parameters for different mass ranges, different RF parameters for different parts of the ion guide/cell, and various RF plus time-invariant potential combinations. The ion guide/cell may comprise different regions, each of which may be operated at the same or different gas pressures. Preferably the energy lift is a RF electrical multipole ion guide which accepts ions at an entrance and transports the ions to an exit. Preferably the exit is spatially distinct from the entrance. The energy lift may be pressurised with gas in order to cool, react and/or fragment the stored ions; accordingly the energy lift is then provided with an enclosure for confining the gas and a gas supply to the enclosure. In one preferred embodiment the energy lift is pressurised with gas in order to cool the ions whilst they are lifted from one electrical potential to another electrical potential. In another preferred embodiment the energy lift is pressurised with gas in order to fragment the ions before or whilst they are lifted from one electrical potential to another electrical potential.

Where the energy lift is a separate ion optical assembly, ions are loaded into the energy lift which is located after the accumulator, lifted by the energy lift from one electrical potential to another electrical potential, loaded from the energy lift into the pulsed ion source which is located after the energy lift, and then ejected from the pulsed ion source. Where the energy lift is incorporated into the pulsed ion source, ions are loaded into the energy lift which is located after the accumulator, lifted by the energy lift from one electrical potential to another electrical potential and then ejected from the pulsed ion source. Where the energy lift is incorporated into the accumulator, ions are loaded into the accumulator, lifted from one electrical potential to another electrical potential by the energy lift without transfer of ions between ion optical devices, and then loaded into the pulsed ion source for subsequent ejection. Where the energy lift is incorporated into either the accumulator or the pulsed ion source, the apparatus has the advantage of relative simplicity, having relatively fewer components. Where the energy lift is a separate ion optical device located between a separate accumulator and a separate pulsed ion source, the apparatus has the advantage of being more flexible in operation, as ions may be lifted from one electrical potential to another whilst either fresh ions are loaded into the accumulator, or whilst downstream ions, i.e. from a previously accumulated and energy lifted batch, are prepared within the pulsed ion source for ejection, or both. Furthermore, the energy lifting operation may be accomplished at a faster rate. Although there are more components, the overall cost of embodiments incorporating a separate energy lift may be lower as each device in the chain, including the electronics, is simpler.

Where the energy lift is a separate ion optical assembly the accumulator is preferably held at a first electrical potential whilst ions are transferred from it and the pulsed ion source is preferably held at a second electrical potential whilst ions are loaded into it. The first and second electrical potentials differ, preferably by at least 1 kV, and preferably the second electrical potential is substantially at the potential required to impart the kinetic energy to the ions required for mass analysis, which may be, for example, 3 to 10 kV. The energy lift is held preferably at or close to the first electrical potential, preferably slightly lower, whilst receiving ions from the accumulator and is raised preferably to a potential at or similar to the second potential, preferably slightly higher, before providing ions to the pulsed ion source. The energy lift is changed in potential in this way whilst the pulsed ion source located downstream of the energy lift is preparing ions for ejection, by for example cooling and/or compression, the ions being those it has received earlier from the energy lift (i.e. a so-called previous batch) and/or whilst the accumulator located upstream of the energy lift is being loaded with fresh ions, thereby increasing the throughput of the pulsed ion source due to several operations being performed parallel in time.

The first electrical potential is preferably provided by a first power supply electrically connected to the accumulator. The second potential is preferably provided by a second power supply electrically connected to the pulsed ion source. The energy lift is preferably electrically connected to a third power supply and a controller is preferably connected to the third power supply and arranged to change the electrical potential of the third power supply from a potential similar to the first potential to a potential similar to the second potential whilst fresh ions are entering the accumulator and/or a previous batch of ions is being prepared for ejection in the pulsed ion source.

The accumulator, energy lift and pulsed ion source may be held at different electrical potentials during different stages of the ion loading and transfer process whilst still working the present invention. For example, the invention may also be worked by holding the accumulator at a potential different from the first electrical potential whilst loading ions into the accumulator and then changing the potential of the accumulator to the first electrical potential at or immediately prior to the step of transferring the ions from the accumulator to the energy lift. Similar considerations apply to the potential of the pulsed ion source, which may be held at one electrical potential whilst ejecting a previous batch of ions and may be held at the second electrical potential whilst receiving a batch of ions from the energy lift.

Where the energy lift is incorporated into the pulsed ion source, the accumulator is held preferably at a first electrical potential whilst ions are transferred from it and the energy lift receives ions whilst being held preferably at or similar to the first electrical potential before being raised to a second electrical potential. The first and second electrical potentials differ, preferably by at least 1 kV, and preferably the second electrical potential is substantially at the potential required to impart the kinetic energy to the ions required for mass analysis. The energy lift is held preferably at or close to the first electrical potential whilst receiving ions from the accumulator and then is raised to the second potential. The energy lift is changed in potential in this way whilst the accumulator located upstream of the energy lift is being loaded with fresh ions, thereby increasing the throughput of the pulsed ion source.

Where the energy lift is incorporated into the accumulator, the accumulator is operated preferably at a first electrical potential, and then the energy lift is held preferably at or similar to the second electrical potential whilst ions are transferred from the energy lift to the pulsed ion source. The first and second electrical potentials differ, preferably by at least 1 kV, and preferably the second electrical potential is substantially at the potential required to impart the kinetic energy to the ions required for mass analysis. The energy lift is raised preferably to a potential at or similar to the second potential before providing ions to the pulsed ion source. The energy lift is changed in potential in this way whilst the pulsed ion source located downstream of the energy lift is preparing a previous batch of ions for ejection which it has received earlier from the energy lift thereby increasing the throughput of the pulsed ion source.

With regard to the embodiments described, preferably, the first potential may be in the range −20 V to +20 V and the second potential may be in the range 3 kV to 10 kV.

Preferably whenever ions are transferred between ion optical devices such as from the accumulator to the energy lift, or from the energy lift to the pulsed ion source, the device receiving ions is held at a similar but slightly different electrical potential from that of the device providing the ions, to facilitate the transfer of ions, particularly ions of different charge states, between the devices; the difference in potential may be a few Volts, e.g. in the range of 0 to 10 V. In some embodiments, the energy lift may first receive ions which have higher than average energies by electrically biasing the lift at a potential which introduces a small energy barrier between the accumulator and the energy lift. Only ions of higher than average energy may pass over the barrier and enter the energy lift. The energy lift may then be changed in electrical potential to that ions of lower energies may enter.

Where the energy lift is incorporated into the accumulator an axial field may be utilised to drive ions from the entrance of the accumulator to the exit of the accumulator where, for example, a cooling gas is used within the accumulator to reduce the energy of the ions whilst in the accumulator, in which case the axial field speeds up the progression of ions through the accumulator and increases the rate at which the method of the present invention may operate. The use of axial fields in this way is known in the art.

In some embodiments the energy lift may first receive ions after collisional cooling with low charge state by electrically biasing the lift or the entrance of the lift with a potential low enough to allow the low charge states (e.g single charge) to go through while the higher charge states see a potential barrier which is a multiple of this potential (q*V) and stay behind. The potential barrier of the energy lift or the entry to the lift can then be changed to allow higher charge states to go through during the next lift cycle.

Similar charge state separation can take place in the exit of the energy lift or the entry of the pulsed ion source Similar coarse m/z separation can be achieved by using the radial stratification effect observed in collisional cooled trapping multipoles when a high amount of charge is stored in them as described by Tomatchev et al. Rapid Commun. Mass Spectrom. 14, 1907-1913 (2000). In this case ions of low m/z which lie closer to the central axis of the accumulation multipole or lift multipole are allowed through by applying a small potential barrier at apertures 54 and 56 accordingly. This small potential does not contribute significantly on the centre of the multipole axis and allows low m/z ions through.

The pulsed ion source may comprise any type of containment device which is arranged to accept ions and then eject them as a packet. The pulsed ion source may temporarily store the ions before ejecting them. The pulsed ion source may comprise an ion guide comprising a multipole, a stack of rings, a funnel, cells comprising pixels and combinations of such devices, or any other type of ion optical guide, trap, store or container. The pulsed ion source may comprise a plate and a grid, or a pair of grids. The pulsed ion source may comprise known orthogonal accelerators and TOF injectors. The pulsed ion source may be an ion trap, a 3-D quadrupole trap, or an electrostatic trap, Preferably the pulsed ion source uses electric and/or magnetic fields in order to contain the ions. The electric and/or magnetic fields may be static or time-varying. Preferably the pulsed ion source is an ion trap or an ion guide, more preferably a multipole ion guide. When the pulsed ion source is an ion guide the ion guide may comprise one or more sections. Various RF potentials may be applied, such as superimposed RF waveforms as for example described in U.S. Pat. No. 7,375,344, different RF parameters for different mass ranges, different RF parameters for different parts of the ion guide/cell, and various RF plus time-invariant potential combinations. The ion guide/cell may comprise different regions, each of which may be operated at the same or different gas pressures. When the pulsed ion source is an ion guide, the ion guide may be substantially straight or may comprise one or more curved sections. The pulsed ion source is preferably a RF electrical multipole ion trap which accepts ions at an entrance and ejects the ions from a separate exit. Preferably the ions are temporarily stored along an axis. The axis may be curved or straight. Preferably the axis is curved with ions entering at one end of the axis, being confined along the axis and being ejected substantially perpendicular to a central portion of the axis, e.g. as in a C-trap, examples of which are further described in WO 2008/081334. The pulsed ion source may be pressurised with gas in order to cool and/or fragment the stored ions. Preferably the pulsed ion source is pressurised with gas in order to cool the ions prior to ejection; accordingly the pulsed ion source is then provided with an enclosure for confining the gas and a gas supply to the enclosure. Where the pulsed ion source is a curved ion guide, preferably the ions are compressed or squeezed into the central portion of the ion guide adjacent the exit, away from the ends of the guide, immediately prior to ejection. Ions may be prepared for ejection within the pulsed ion source by various processes, including, for example, cooling, raising or lowering in energy, movement within the pulsed ion source, confinement to a specific region of the pulsed ion source, and ion compression. Preferably preparing for ejection comprises cooling the ions and compressing them into a portion of the pulsed ion source adjacent an exit.

The pulsed ion source ejects ions for entry into a mass analyzer. The ions may pass directly into the mass analyzer. Preferably the ions pass through additional lenses before reaching the mass analyzer. Preferably the lenses steer the packet of ions in such a way as to substantially separate it from any gas which also emanates from the pulsed ion source, so as to reduce the gas load on the mass analyzer. The pulsed ion source may eject one packet of ions for each batch of ions it receives. Alternatively and preferably the pulsed ion source may eject many packets of ions for each batch of ions it receives. Preferably the pulsed ion source is located close to the entrance to the mass analyzer so that the time of flight of ions between the pulsed ion source and the analyzer is minimised.

For use with TOF or EST analysers, the ions must typically be raised in potential by several kV before ejection from the pulsed ion source for entry into the mass analyser in order for mass analysis to be accomplished, and the pulsed ion source must be held at a very stable potential with respect to the TOF or EST analyser at the moment of ion ejection since the ion energy at ejection is matched to the analyser such that ions entering the analyser have the kinetic energy required for mass analysis within the mass analyser. In the present invention ions are raised up to the required potential in order to facilitate subsequent ejection, not to directly deliver ions into a mass analyser. It will be appreciated that only electrical potential differences are of importance since the mass analyser might be floated to any suitable potential above ground.

The mass analyzer may be any type of mass analyzer that accepts packets of ions for analysis. Preferably the mass analyzer is an EST or a TOF mass analyzer but the invention is not necessarily limited to application with only such analyzers.

The transfer of ions between ion optical devices may not be without ion loss. Accordingly, herein transfer of a batch of ions means at least some ions are transferred between devices during the various steps of the method of the present invention. In addition, it might be desirable to transfer only a proportion of the ion population in a device, if, for example, a downstream device has an upper limit on the number of ions it can process at one time. For these reasons the invention is not limited to the case where all ions are transferred between devices in each or any step of the method.

Herein a batch of ions means a quantity of ions. The method and apparatus of the present invention provide an increased throughput of a batch of ions through ion optical devices as part of a process of preparing the batch of ions for ejection from a pulsed ion source. During the process, the batch of ions may be loaded or transferred into or between the ion optical devices as a single distinct batch; or, the batch may be part of a larger quantity; or, the batch may be loaded or transferred in parts over a period of time; or, the batch may be loaded or transferred continuously over a period of time; or, the batch may only be formed together as a single batch part way through the process of preparing the batch of ions for ejection from the pulsed ion source. The claimed invention refers to the batch of ions and in so doing tracks the progress of the ions that ultimately form that batch as they progress through the ion optical devices, without necessarily implying that the ions are loaded or transferred in a single group during any particular operation of the process, unless the context requires it. For example, a batch of ions which is prepared for ejection in the pulsed ion source may have been formed from a larger quantity of ions accumulated continuously over a period of time in the accumulator.

The invention provides an increased throughput of ions by performing certain operations in parallel. The invention provides a means for raising ions to elevated potentials in readiness for injection into a mass analyzer, and for efficient detection without post acceleration at the detector, thereby avoiding increased temporal aberrations. Furthermore, the means for raising the ions to elevated potential is not positioned downstream of the pulsed ion source thereby allowing the pulsed ion source to be positioned close to a mass analyzer, thereby reducing time of flight separation of the ions before they reach the mass analyzer which is undesirable for some types of analyser. The invention enables the interfacing of atmospheric pressure ion sources at substantially ground potential. The invention enables the pulsed ion source to eject ions to the mass analyzer with reduced voltage ejection pulses, which allows the high speed power supplies to be less complex and of lower cost, e.g. the pulsed source may be held at the second potential of the order of 3 to 20 kV and an ejection voltage of only 100 to 2000 V may need to be applied. In some embodiments the invention decouples two potential regions within the instrument. In some embodiments one or both of ion cooling and ion fragmentation are provided. The invention allows present designs of ion optical devices such as, for example, pre-selection devices and collision cells to be used without modification. In some embodiments present designs of the pulsed ion source may be used without modification and high accuracy pulsing can be achieved for TOF applications without major redesign in electronics and mechanics. In some embodiments a reduction in the number of components raised to high potential is achieved and a reduction in the inductance of such components thereby making the electronic simpler.

Some embodiments of the present invention allow an almost continuous accumulation of ions in an accumulator with relatively short time periods taken to transfer ions to an energy lift during which accumulation cannot occur, thereby enabling the utilisation of almost all the beam delivered to the accumulator from a continuous ioniser. In other embodiments accumulation of ions may take place within the accumulator at the same time as ions are being transferred from the accumulator to the energy lift and accumulation is then continuous.

In embodiments in which the energy lift is separate from the pulsed ion source, a much less accurate lift in energy is required as the ions are subsequently cooled in the pulsed ion source during preparation for ejection. A much faster lift in energy may be achieved as the problem of electronic ringing is alleviated, and power supply accuracy requirements are reduced. In addition, the energy lift may, in these embodiments, comprise a simpler ion storage device as it does not have to also comprise a TOF injector.

More than one accumulator may be utilised in the present invention. In some applications one accumulator will accumulate ions of one mass to charge ratio, or a selected range of mass to charge ratios, whilst a second accumulator will accumulate ions of a second mass to charge ratio, or a second range of mass to charge ratios. The plurality of accumulators may be in parallel, or in series, or where there are more than two accumulators, a combination of the two. The accumulator or accumulators may, for example, comprise electrical potential wells formed within a structure, and where there is more than one accumulator, a plurality of potential wells may be formed within a single structure, such as is described in U.S. Pat. No. 5,206,506. Where there are two or more accumulators in parallel, ions may be accumulated in one accumulator whilst a previous batch of ions is transferred from a second accumulator to an energy lift, the parallel accumulators providing continuous accumulation from an ion source.

Any or all of the one or more accumulators, the pulsed ion source and the energy lift may be filled concurrently with ions from different sources and/or of differing populations. Differing populations include a first population comprising ions originating from a sample and a second population comprising ions from a calibration source, for example providing an internal calibrant. Some advantages of combining populations of ions are described in WO2006/129083.

Whilst the invention accelerates ions to potentials suitable for EST and TOF analysis, it may be augmented by a further, post acceleration stage, after the analyser and immediately prior to detection, to provide enhanced secondary electron generation for high mass ions.

DETAILED DESCRIPTION

Figure 1A:
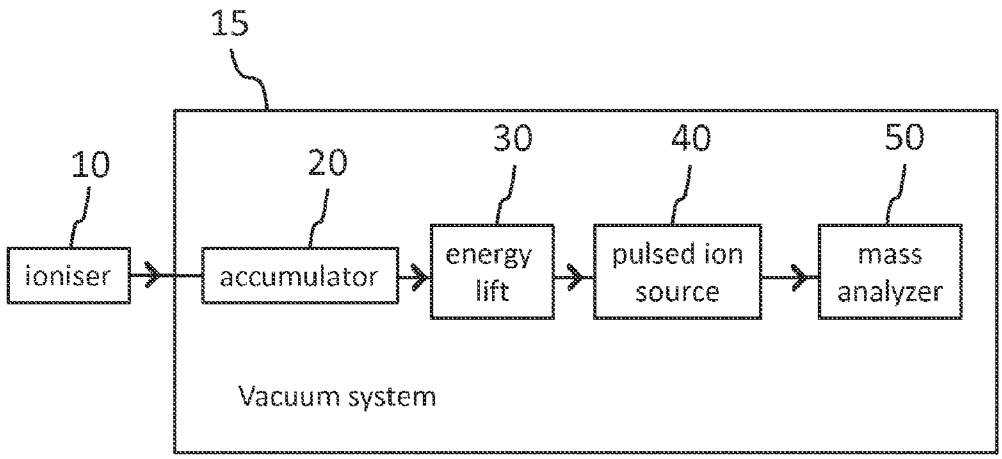
FIG. 1 illustrates three preferred embodiments of the invention in block diagram form.
Figure 1B:
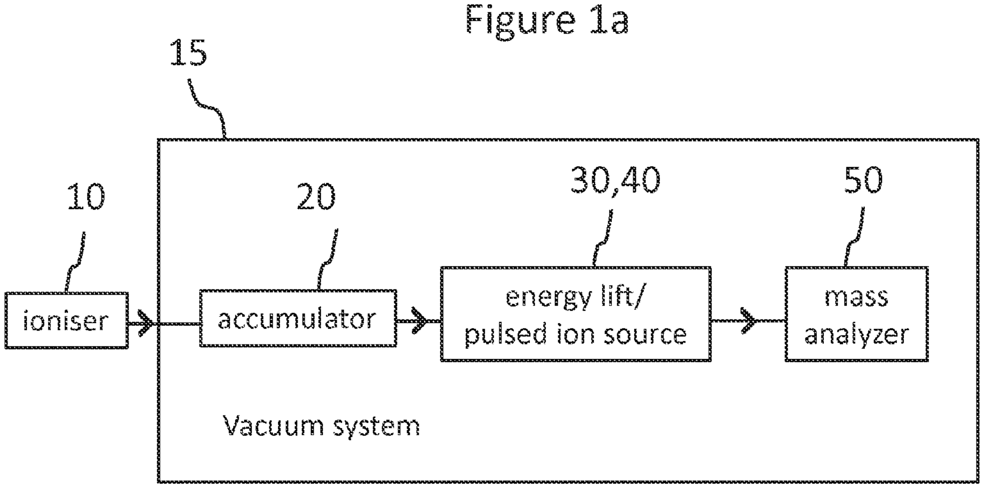
Figure 1C:
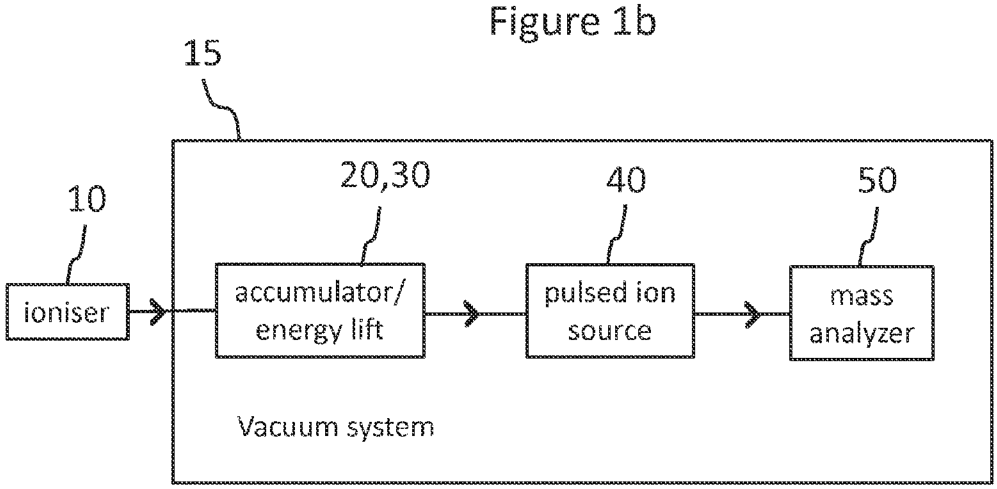

Various embodiments of the present invention will now be described by way of the following examples and the accompanying Figures. Referring to FIG. 1*a*, 1*b* and 1*c*, ions are produced in ioniser 10, which operates at substantially atmospheric pressure, and are transferred into accumulator 20 which, together with all other downstream components 20, 30, 40, 50, lies within vacuum system 15. Vacuum system 15 comprises several differentially pumped chambers (not shown) in which different ion optical assemblies reside. Components 20, 30, and 40 reside in one common vacuum chamber, though multiple chambers may be used. Not all the ion optical assemblies utilised within the instrument are depicted in FIG. 1. Ions are transferred into accumulator 20 via additional ion optical assemblies, such as, for example, lenses, funnels, multipoles, collision cells, etc. which also reside within the vacuum system 15 but which are not shown in this figure. Other mass analysers may be present between the ioniser and the accumulator, with or without fragmentation devices, but for clarity these are not shown in the figure. FIG. 1*a* illustrates one preferred embodiment in which an energy lift 30 is a separate ion optical assembly located between accumulator 20 and a pulsed ion source 40. In this embodiment ions are transferred from accumulator 20 into energy lift 30 and are then transferred from energy lift 30 into pulsed ion source 40 for subsequent ejection. The embodiment of FIG. 1*a* provides the benefit that whilst ions are raised in potential within the energy lift 30, a fresh batch of ions may be being accumulated within accumulator 20, and/or a previous batch of ions may be prepared for ejection within pulsed ion source 40.

FIG. 1*b* illustrates another preferred embodiment in which energy lift 30 is incorporated into pulsed ion source 40. In this embodiment ions are transferred into energy lift 30 and are subsequently ejected from pulsed ion source 40, the ions having been lifted in energy in energy lift 30 and prepared for ejection within pulsed ion source 40 without further transfer between ion optical devices and therefore without possible transmission loss, providing a benefit over the embodiment of FIG. 1*a*. In this embodiment, whilst ions are lifted in energy by energy lift 30, a fresh batch of ions is loaded into accumulator 20.

FIG. 1*c* illustrates another preferred embodiment in which energy lift 30 is incorporated into accumulator 20. In this embodiment ions are transferred into accumulator 20 and are subsequently lifted in energy by energy lift 30, the ions having been accumulated in accumulator 20 and lifted in energy within energy lift 30 without further transfer between ion optical devices and therefore without possible transmission loss, providing a benefit over the embodiment of FIG. 1*a*. In this embodiment, whilst ions are lifted in energy by energy lift 30, a previous batch of ions is prepared for ejection within pulsed ion source 40. Following ejection of the previous batch of ions from the pulsed ion source 40, ions are transferred from energy lift 30 into pulsed ion source 40 for subsequent ejection.

In FIG. 1*a*, 1*b* and 1*c* ions ejected from pulsed ion source 40 are directed to mass analyzer 50. Additional ion optical assemblies such as lenses and ion gating devices, for example, may be located between pulsed ion source 40 and mass analyzer 50, but are not shown in the figure.

In all cases described herein, the accumulator, energy lift and pulsed ion source may or may not be substantially empty when a batch of ions is loaded into it. For example, the pulsed ion source may have a capacity larger than that of the energy lift, and may itself accumulate batches of ions from the energy lift before finally ejecting all or some of the accumulated ions to a mass analyzer.

It is envisaged that all types of ionisers may be utilised with the present invention. Examples include electrospray ionization (ESI), atmospheric pressure photo-ionization, atmospheric pressure chemical ionization (APCI), matrix-assisted laser desorption/ionization (MALDI), atmospheric pressure matrix-assisted laser desorption/ionization (AP MALDI), laser desorption ionization (LDI), desorption/ionisation in silicon (DIOS), chemical ionization (CI), field ionization (FI), field desorption (FD), thermal desorption, inductively coupled plasma (ICP), fast atom bombardment (FAB), desorption electrospray ionization (DESI). The invention has additional advantages when used with atmospheric pressure ionisers as it enables the interfacing of these ion sources at substantially ground potential.

Various means for transferring ions from ionisers which operate at atmospheric pressure are known in the art. Typically they may include ion guides which may comprise for example multipoles, multiple ion rings, funnels, cells comprising pixels and combinations of such devices. Various RF potentials may be applied, such as superimposed RF waveforms as for example described in U.S. Pat. Nos. 7,375,344, 6,812,453, 6,693276, 6,911,650, different RF parameters for different mass ranges, different RF parameters for different parts of the ion guide/cell, and various RF plus time-invariant potential combinations. Ion guides and lenses may use RF or DC potentials or combinations thereof. The ion guide/cell may comprise different regions, each of which may be operated at the same or different gas pressures. Axial potential gradients, or multiple ion guides may be used to transport ions from an atmospheric pressure ion source into the high vacuum of the instrument, as is well known in the art. These guides may be used in conjunction with various types of ion lenses and deflector systems. Ion guides and lenses may span differentially pumped vacuum regions, or may be confined to separate vacuum regions. Magnetic lenses, filters or sectors may also be used. Ion transfer may be mass selective, charge selective, or ion mobility selective, for example.

The apparatus may include various stages of ion processing, including ion mobility separation, mass selection, fragmentation, reaction and cooling. Ion mobility spectrometry may be performed following ionization, including FAIMS. Ion mobility apparatus may be incorporated up or downstream of a first mass selector, preceding the energy lift. Further ion guides of known types may be incorporated into the instrument for other purposes including for example multipoles, multiple ion rings, funnels, cells comprising pixels and combinations of such devices. Again, various RF potentials may be applied, such as superimposed RF waveforms as for example described in U.S. Pat. No. 7,375,344, different RF parameters for different mass ranges, different RF parameters for different parts of the ion guide/cell, and various RF plus time-invariant potential combinations. Ion guides and lenses may use RF or DC potentials or combinations thereof. The ion guide/cell may comprise different regions, each of which may be operated at the same or different gas pressures. The instrument configuration may include a first mass selector (MS1), upstream of the energy lift, for preselecting ions of a mass to charge ratio or a range of mass to charge ratios. MS1 may comprise for example a quadrupole mass filter, a linear ion trap such as a LTQ, a time of flight mass selector, a 3D ion trap, a magnetic sector, and electrostatic trap or any other form of mass filter. Fragmentation devices may also be incorporated, such as for example devices operating in CID, photo dissociation, ETD or ECD modes of operation, or combinations of such modes. Various types of ion guide/cells may be utilised for the fragmentation device, including the examples given above.

In a preferred embodiment, prior to being lifted in energy, mass selection followed by fragmentation is used to process the ions.

Herein, whilst a batch or multiple batches of ions are described as progressing through the accumulator, energy lift and pulsed ion source, it is to be understood that the batch or batches may be only part of the quantity of ions that is transferred into a particular device. The description and claims herein follow the progress of ions which are ultimately ejected from the pulsed ion source and accordingly describe them as a batch. That batch is followed through the various stages of accumulation, energy lifting and preparation for ejection. However as already explained, accumulation, for example, in the accumulator, may be a continuous process, and the batch of ions ultimately ejected from the pulsed ion source will have, in such a case, been part of the continuous stream of ions entering the accumulator at a previous time. Accordingly, the term batch is not to be construed as limiting the invention to the processing of only discrete batches of ions, rather it is be understood that the progress of what ultimately becomes a batch of ions is described.

Figure 2:
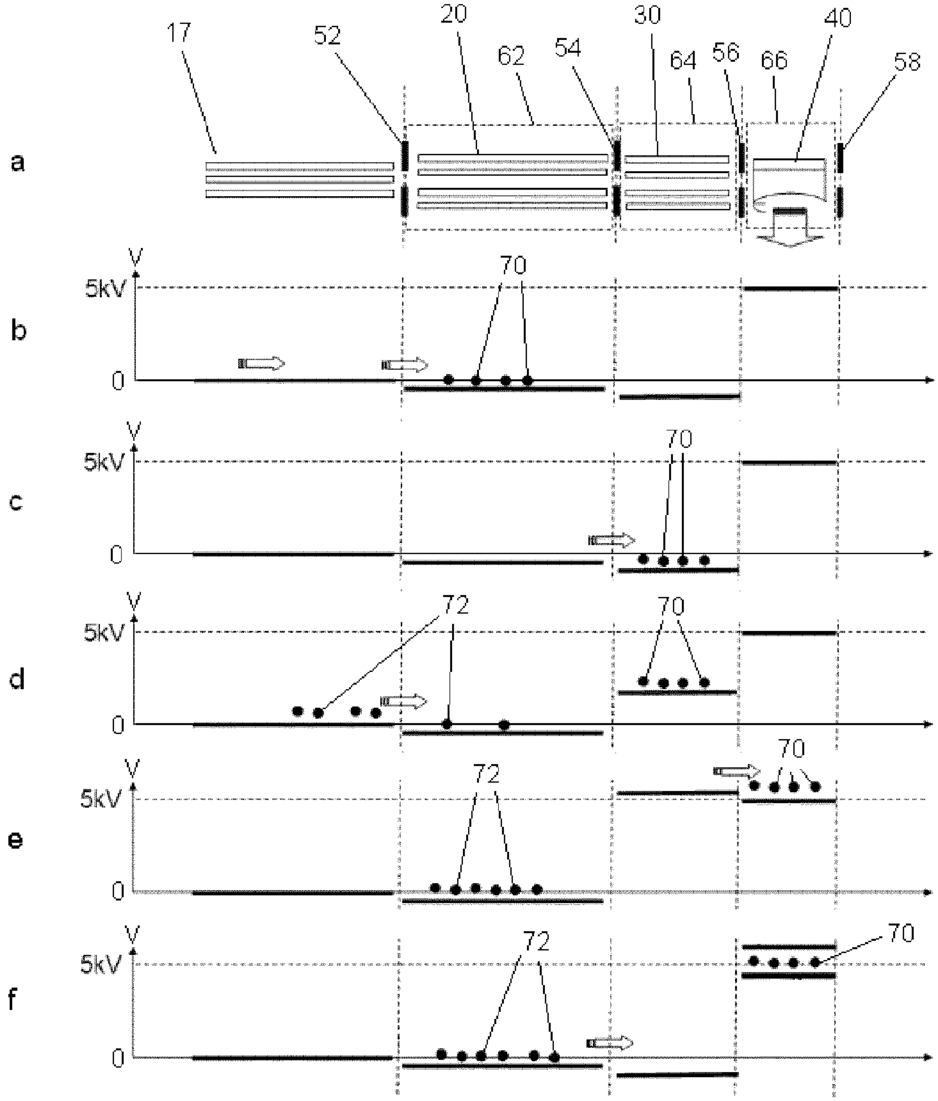
FIG. 2 is a schematic representation of apparatus of one embodiment of the present invention together with potential vs. position diagrams.

FIG. 2 describes one preferred embodiment of the present invention. The embodiment of FIG. 2*a* comprises a mass selector (MS1) 17, accumulator 20, energy lift 30 and pulsed ion source 40 comprising a C trap. Apertures 52, 54, 56, 58 separate and terminate regions enclosing devices 17, 20, 30 and 40. Enclosures 62, 64, 66 surround devices 20, 30 and 40 respectively. FIGS. 2*b*-2*f* show schematic diagrams of electrical potential, V, vs. location within the devices shown in FIG. 2*a*. FIGS. 2*b*-2*f* show the electrical potentials applied to the parts of the embodiment of FIG. 2*a* as the method of the present invention is performed.

Referring to FIG. 2, ions 70 are mass selected in MS1 17 which comprises a quadrupole mass filter, held at an electrical potential near 0V, as shown in FIG. 2*b*. Accumulator 20, comprising a multipole ion guide, is held at an electrical potential slightly lower than that of quadrupole 17, to facilitate the transfer of a batch of positive ions 70 from quadrupole 17 into accumulator 20. Clearly, where negative ions are to be utilised, polarities of applied potentials as described throughout the description herein will be reversed. In all embodiments herein described, the transfer of ions between devices might result in some ion loss, and consequently whilst all ions are depicted in the figures as being successfully transferred, some might in practice be lost.

FIG. 2*b* shows the batch of ions 70 transferred from quadrupole 17 into accumulator 20. FIG. 2*c* depicts the invention at a point immediately prior to initiating the energy lifting process and shows ions 70 having being transferred from accumulator 20 into energy lift 30; energy lift 30 being held at an electrical potential similar to but slightly lower by, for example 0 to 5 V, than that of accumulator 20 to facilitate ion transfer. Energy lift 30 comprises a multipole ion guide. FIG. 2*d* illustrates the process of energy lifting, in which ions 70 within energy lift 30 are raised in electrical potential. FIG. 2*d* shows the lift 30 partially elevated in potential. In this figure, a further feature of the present invention is also shown in which a fresh batch of ions 72 is loaded from quadrupole 17 into accumulator 20 whilst the energy lifting process is being carried out. FIG. 2*e* shows the energy lift 30 at a potential similar to but slightly higher than that of pulsed ion source 40, by for example 0 to 5 V, to facilitate transfer of ions 70 from lift 30 into source 40. Pulsed ion source 40 comprises a curved linear trap known as a C trap. In operation during various steps of the method, the C trap accepts ions 70 at an entrance at one end of the curved axis, cools the ions, compresses the ions into a central portion of the trap adjacent an exit, and ejects the ions from the trap to a mass analyzer (not shown). Fresh ions 72 have now been loaded into accumulator 20. FIG. 2*f* shows energy lift 30 lowered to receive the additional ions 72, meanwhile ions 70 are being cooled prior to ejection from pulsed ion source 40.

Figure 3:
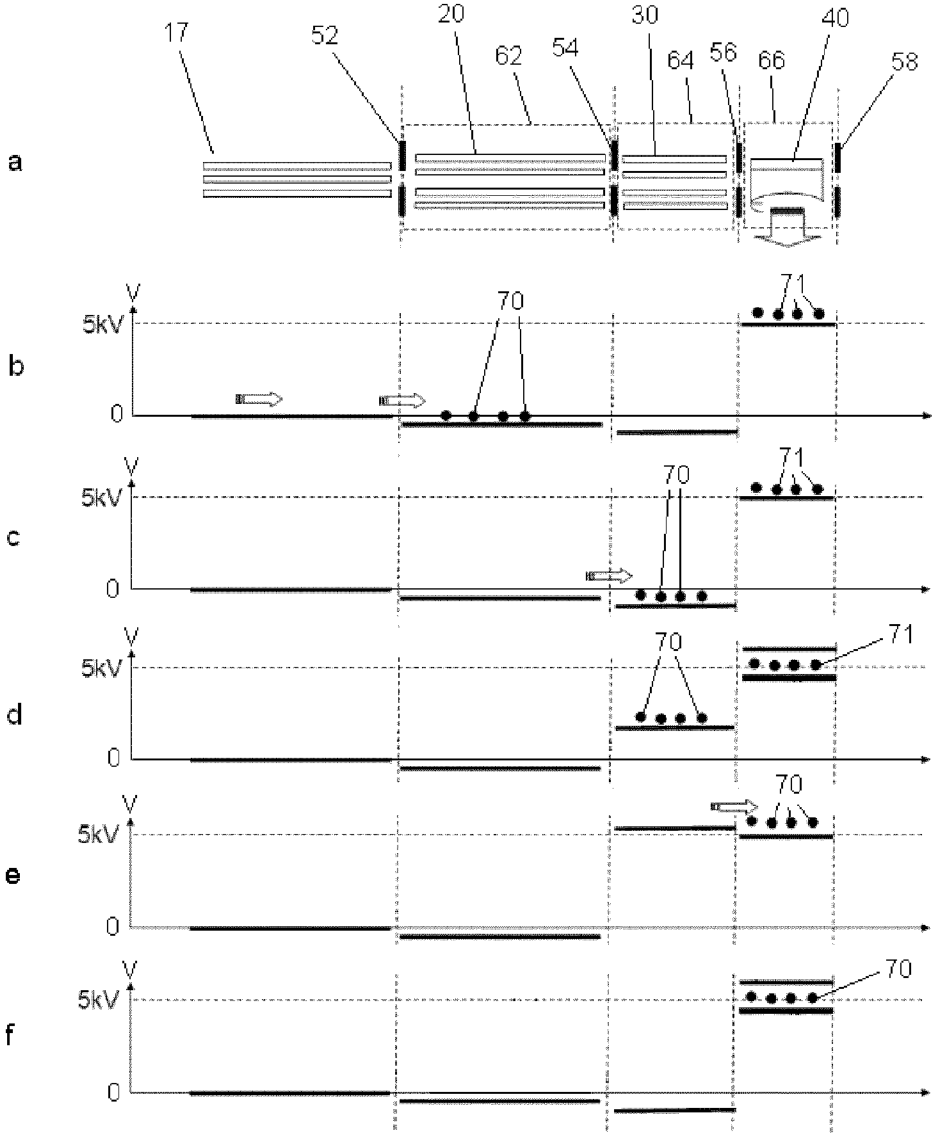
FIG. 3 is a schematic representation of apparatus of a further embodiment of the present invention together with potential vs. position diagrams.

FIG. 3 describes another preferred embodiment of the present invention. The embodiment of FIG. 3*a* is similar to that of FIG. 2*a* and comprises a mass selector (MS1) 17, accumulator 20, energy lift 30 and pulsed ion source 40. Apertures 52, 54, 56, 58 act as ion gates and separate and terminate regions enclosing devices 17, 20, 30 and 40. Enclosures 62, 64, 66 surround devices 20, 30 and 40 respectively. FIGS. 3*b*-3*f* show schematic diagrams of electrical potential, V, vs. location within the devices shown in FIG. 3*a*. FIGS. 3*b*-3*f* show the electrical potentials applied to the parts of the embodiment of FIG. 3*a* as the method of the present invention is performed in an alternate form to that depicted in FIG. 2. Ions 70 are mass selected in MS1 17 which comprises a quadrupole mass filter, held at an electrical potential near 0V, as shown in FIG. 3*b*. Accumulator 20, comprising a multipole ion guide, is held at an electrical potential similar to but slightly lower than that of quadrupole 17, to facilitate the transfer of the batch of positive ions 70 from quadrupole 17 into accumulator 20. FIG. 3*b* shows ions 70 transferred from quadrupole 17 into accumulator 20. A previous batch of ions 71 is held within pulsed ion source 40 at elevated potential having been transferred there as described above with reference to FIG. 2. FIG. 3*c* depicts the invention at a point immediately prior to initiating the energy lifting process and shows ions 70 having being transferred from accumulator 20 into energy lift 30; energy lift 30 being held at an electrical potential similar to but slightly lower than that of accumulator 20 to facilitate ion transfer. FIG. 3*d* illustrates the process of energy lifting, in which ions 70 within energy lift 30 are raised in electrical potential. FIG. 3*d* shows the lift 30 partially elevated in potential. In this figure, a further feature of the present invention is also shown in which the previous batch of ions 71 is prepared for ejection by, in this case, cooling and compression, whilst the energy lifting process is being carried out. FIG. 3*e* shows the energy lift 30 at a potential similar to but slightly higher than that of pulsed ion source 40 to facilitate transfer of ions 70 from lift 30 into source 40. The previous batch of ions 71 have by now been ejected from pulsed ion source 40 and are not shown in FIG. 3*e*. FIG. 3*f* shows energy lift 30 lowered to receive the next batch of ions (not shown), meanwhile ions 70 are being prepared for ejection from pulsed ion source 40.

Figure 4:
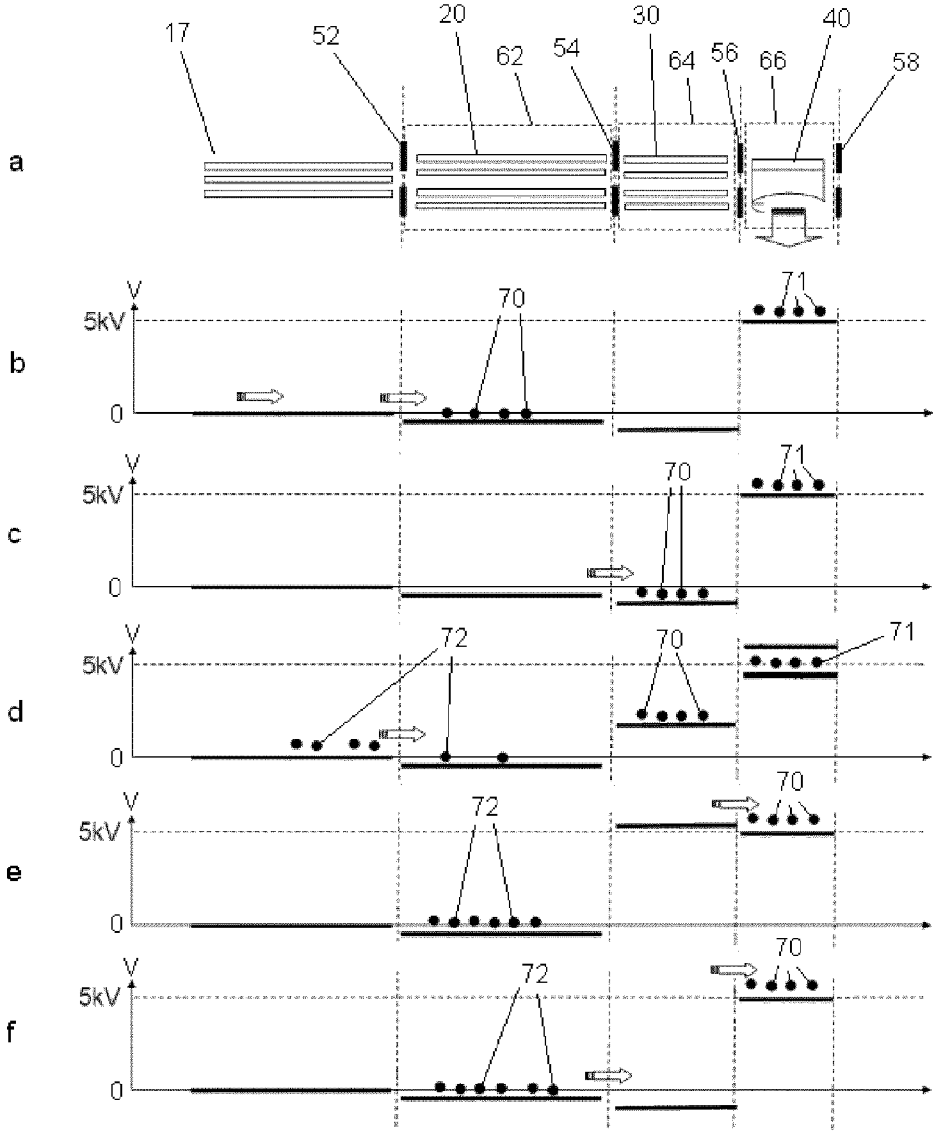
FIG. 4 is a schematic representation of apparatus of a still further embodiment of the present invention together with potential vs. position diagrams.

FIG. 4 describes another preferred embodiment of the present invention in which the energy lifting process of ions 70 occurs whilst both a fresh batch of ions 72 is accumulated in accumulator 20 and a previous batch of ions 71 is prepared for ejection within pulsed ion source 40. In this embodiment, the ion optical devices are as described in relation to FIGS. 2 and 3. FIGS. 4*b*-4*f* again show schematic diagrams of electrical potential, V, vs. location within the devices shown in FIG. 4*a*, and as applied to the parts of the embodiment as the method of the present invention is performed. FIG. 4*b* shows a batch of ions 70 being loaded into accumulator 20 from MS1 quadrupole 17, whilst a previous batch of ions 71 is held within pulsed ion source 40. Accumulator 20 is held at a similar but slightly lower potential than quadrupole 17 during the transfer process. FIG. 4*c* shows ions 70 transferred into energy lift 30 from accumulator 20; lift 30 being held at a similar but slightly lower potential than accumulator 20. FIG. 4*d* shows previous batch of ions 71 being prepared for ejection from pulsed ion source 40, and a fresh batch of ions 72 being loaded into accumulator 20 whilst ions 70 are being lifted in electrical potential within energy lift 30. FIG. 4*e* shows ions 70 loaded into pulsed ion source 40, previous batch of ions 71 having been ejected from the source 40, and it shows fresh ions 72 within accumulator 20. FIG. 4*f* shows ions 70 held within pulsed ion source 40 and fresh ions 72 being prepared for transfer into energy lift 30.

Figure 5:
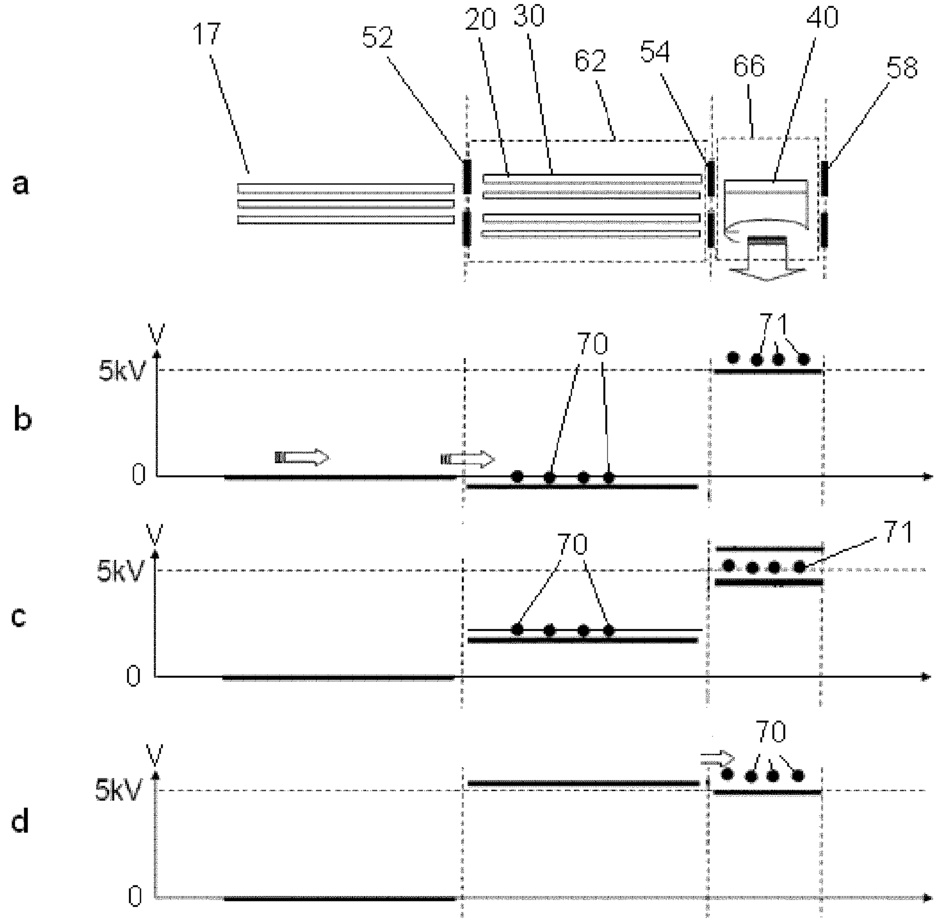
FIG. 5 is a schematic representation of apparatus of another embodiment of the present invention together with potential vs. position diagrams.

FIG. 5 illustrates a further embodiment of the present invention, in which energy lift 30 is incorporated into accumulator 20. Accumulator 20 is a multipole ion guide. Otherwise, the ion optical devices are as described in relation to FIGS. 2 and 3. FIGS. 5*b*-5*d* again show schematic diagrams of electrical potential, V, vs. location within the devices shown in FIG. 5*a*, and as applied to the parts of the embodiment as the method of the present invention is performed. FIG. 5*b* shows a batch of ions 70 being loaded into accumulator 20 from MS1 quadrupole 17, whilst a previous batch of ions 71 is held within pulsed ion source 40. Accumulator 20 is held at a similar but slightly lower potential than quadrupole 17 during the transfer process. FIG. 5*c* shows previous batch of ions 71 being prepared for ejection from pulsed ion source 40 whilst ions 70 are being lifted in electrical potential within energy lift 30. As accumulator 20 incorporates energy lift 30, no transfer of ions takes place between accumulator 20 and energy lift 30. Aperture 52 acts as an ion gate. FIG. 5*d* shows ions 70 loaded into pulsed ion source 40 from energy lift 30, energy lift 30 being held at a similar but slightly higher electrical potential than pulsed ion source 40 to facilitate transfer. Previous batch of ions 71 has by now been ejected from pulsed ion source 40.

Figure 6:
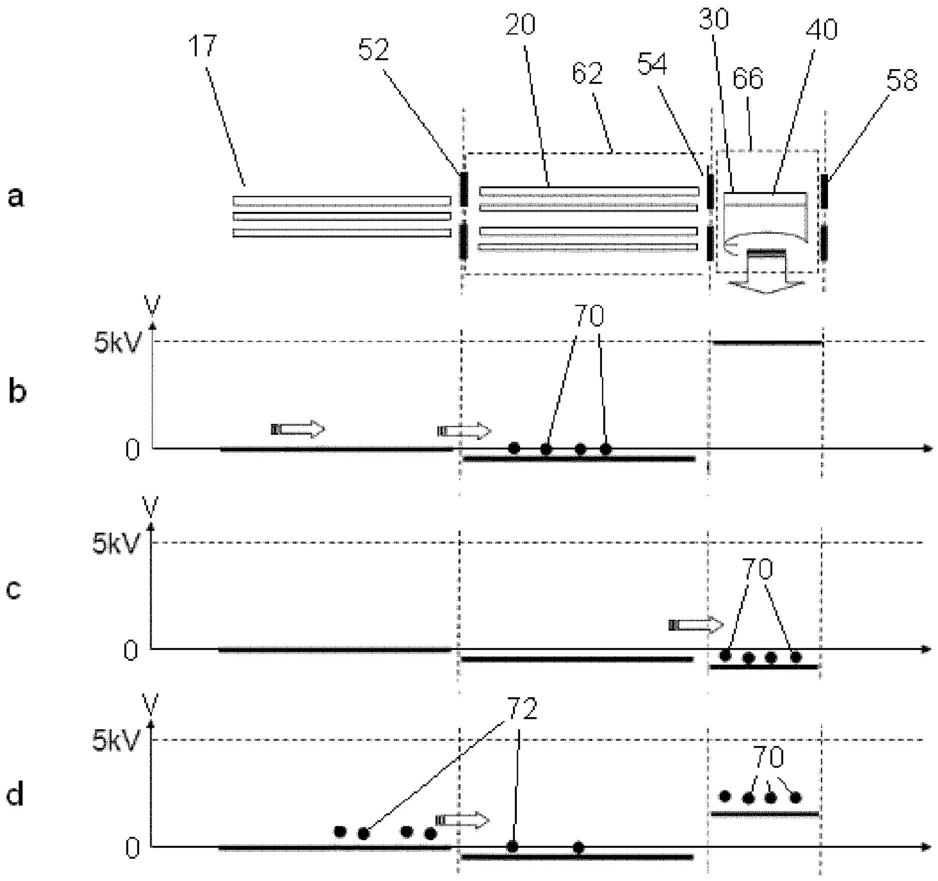
FIG. 6 is a schematic representation of apparatus of another embodiment of the present invention together with potential vs. position diagrams.

FIG. 6 illustrates a further embodiment of the present invention, in which energy lift 30 is incorporated into pulsed ion source 40. Pulsed ion source 40 is a C trap. Otherwise, the ion optical devices are as described in relation to FIGS. 2 and 3. FIGS. 6*b*-6*d* again show schematic diagrams of electrical potential, V, vs. location within the devices shown in FIG. 6*a*, and as applied to the parts of the embodiment as the method of the present invention is performed. FIG. 6*b* shows a batch of ions 70 being loaded into accumulator 20 from MS1 quadrupole 17. Accumulator 20 is held at a similar but slightly lower potential than quadrupole 17 during the transfer process. FIG. 6*c* shows ions 70 being transferred from accumulator 20 into energy lift 30, energy lift 30 being held at a similar but slightly lower potential than that of accumulator 20. FIG. 6*d* shows ions 70 being lifted in energy by energy lift 30, whilst at the same time a fresh batch of ions 72 are being loaded into accumulator 20 from quadrupole 17.

Figure 7:
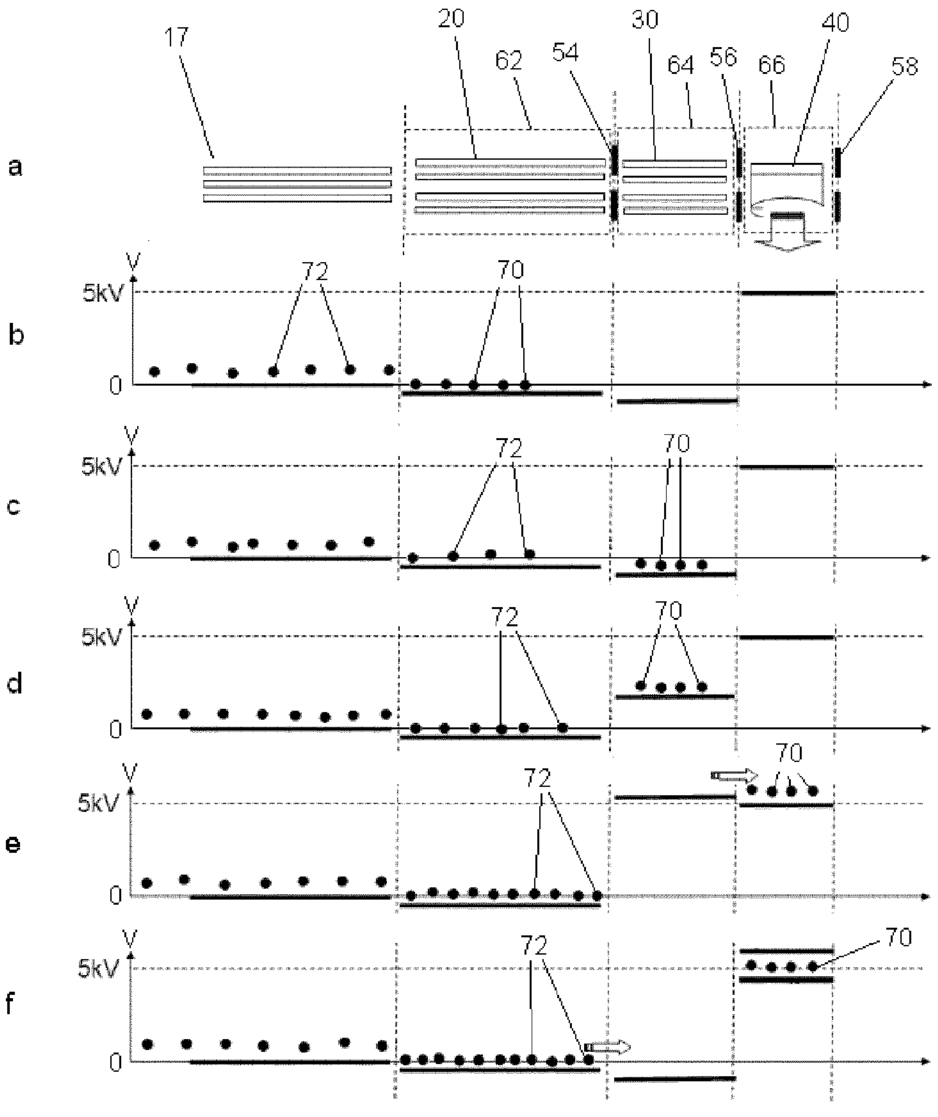
FIG. 7 is a schematic representation of apparatus of still another embodiment of the present invention together with potential vs. position diagrams.

FIG. 7 illustrates continuous accumulation in accumulator 20. Components like to those in FIG. 2 have been given the same numerical identifier. In this embodiment, gate 52 is absent. Gate 52 is an optional feature. Ions 70 are mass selected in MS1 17 which comprises a quadrupole mass filter, held at an electrical potential near 0V, as shown in FIG. 7*b*. Accumulator 20, comprising a multipole ion guide, is held at an electrical potential slightly lower than that of quadrupole 17, to facilitate the transfer of a batch of positive ions 70 from quadrupole 17 into accumulator 20. FIG. 7*b* shows the batch of ions 70 transferred from quadrupole 17 into accumulator 20, meanwhile a continuous stream of ions is passing through MS1 17. FIG. 7*c* depicts the invention at a point immediately prior to initiating the energy lifting process and shows ions 70 having being transferred from accumulator 20 into energy lift 30; energy lift 30 being held at an electrical potential similar to but slightly lower by, for example 0 to 5 V, than that of accumulator 20 to facilitate ion transfer. Meanwhile ions 72 continue to pass through MS1 17 and are accumulated in accumulator 20. Energy lift 30 comprises a multipole ion guide. FIG. 7*d* illustrates the process of energy lifting, in which ions 70 within energy lift 30 are raised in electrical potential. FIG. 7*d* shows the lift 30 partially elevated in potential. Additional ions are meanwhile entering accumulator 20. FIG. 7*e* shows the energy lift 30 at a potential similar to but slightly higher than that of pulsed ion source 40, by for example 0 to 5 V, to facilitate transfer of ions 70 from lift 30 into source 40. Pulsed ion source 40 comprises a curved linear trap known as a C trap. In operation during various steps of the method, the C trap accepts ions 70 at an entrance at one end of the curved axis, cools the ions, compresses the ions into a central portion of the trap adjacent an exit, and ejects the ions from the trap to a mass analyzer (not shown). FIG. 7*f* shows energy lift 30 lowered to receive the additional ions 72, meanwhile ions 70 are being cooled prior to ejection from pulsed ion source 40, and a continuous stream of ions enters accumulator 20.

In all embodiments, where pulsed ion source 40 comprises a device loaded axially, it can be loaded by a symmetrical system from the other side in which ions enter the pulsed ion source from the other end of the axis. In such cases, a separate accumulator and/or energy lift may be provided on the other side of pulsed ion source 40. Such a symmetric system can provide anions for ETD, calibrant ions or another ioniser can be utilised, for example an ESI ioniser may be located upstream of MS1 17 and a MALDI source may be positioned on the other side of pulsed ion source 40. In such configurations the accumulator, energy lift and/or pulsed ion source may be filled concurrently with different populations of ions, such as, for example, sample ions and internal calibrant ions, with one population arriving from one axial direction and another population arriving from another axial direction. Alternatively the accumulator, energy lift and/or pulsed ion source may be filled concurrently with different populations of ions using upstream interlaced multipole devices such as are described in US patent application 2010/0176295, or branched multipole devices such as are described in U.S. Pat. No. 7,420,161, for example.

In all of the embodiments of FIGS. 2, 3, 4, 5, 6 and 7, ions may be processed within accumulator 20 prior to being transferred into energy lift 30 or prior to being lifted in energy where energy lift 30 is incorporated into accumulator 20. Preferred forms of ion processing include fragmentation and cooling. Where fragmentation and cooling occur with an accumulator comprising a multipole, a potential gradient may be required within the multipole to facilitate the transportation of ions along the multipole from entrance to exit.

Typically the time required to raise the ions from near ground potential up to the kV electrical potentials required for TOF and EST operation (3-10kV) may be several ms. Preferably this time will be ~2 ms. Typically the time required to cool ions in the pulsed ion source 40 as part of the preparation for ejection is also ~2 ms. Hence embodiments of the invention in which these processes are performed in parallel are advantageous in increasing the throughput of the pulsed ion source. Typically the time required to ensure efficient fragmentation of ions also takes ~2 ms. Where this fragmentation is performed as a processing step within accumulator 20 it is also advantageous to perform this processing step in parallel with the step of raising ions to elevated potential within energy lift 30. More preferably both fragmentation within accumulator 20 and ion cooling within pulsed ion source 40 will both be performed in parallel with the step of raising ions to elevated potential within energy lift 30.

As described in relation to FIGS. 2-6, the present invention is preferably utilised in systems which include a mass filter MS1 upstream of the accumulator, and hence in instruments configured for MS-MS. However as FIG. 1 describes, such a mass selector is not an essential feature. Alternatively, instrument configurations may include more than two mass analyzers, or may include the use of one or more mass analyzers multiple times, to facilitate MS-MS or $MS^n$. Some mass selection operations may be performed before the energy lifting process, or alternatively all mass selection and analysis may be performed downstream of the energy lift.

A preferred form of pulsed ion source is the C trap, as already referred to. An example of a C trap is described in U.S. Pat. No. 7,425,699. An alternative to the C trap is also described therein in the form of a linear trap.

Mass analyzers suitable for use with the present invention include, for example, linear TOF, reflecting TOF, multi-reflecting TOF, sector TOF, multi-sector TOF and EST. Preferred analyzers include the Orbitrap™ electrostatic trap and multi-reflecting TOF formed from two closely-coupled linear field mirrors comprising inner and outer field-defining electrode systems elongated along an axis.

Charged particle detectors suitable for use with the present invention include image current detection systems, electron multipliers and channel plates, for example. Where the detection system incorporates the conversion of ions to electrons, a further advantage of the present invention is realized as the ions may be lifted in energy using the present invention prior to detection, improving the conversion efficiency.

The method and apparatus of the present invention are preferably used within a mass spectrometer system to improve ion throughput therein. Such a mass spectrometer system preferably includes an ionization source for ionizing source material, ion transport systems such as for example lenses, deflectors and guides, to move at least some ions from the ionizer to the accumulator, a mass analyzer to receive at least some ions from the pulsed ion source, and a detector for detecting at least some mass separated particles from the mass analyzer. Ion optical components suitable for these various processes are well known to those skilled in the art and the invention is not limited by any particular types of ionizer, ion transport systems, mass analyzer or detection systems. The mass spectrometer system typically produces a mass spectrum from the detected ions which is representative of materials present in the sample material.

As used herein, including in the claims, unless the context indicates otherwise, singular forms of the terms herein are to be construed as including the plural form and vice versa. For instance, unless the context indicates otherwise, a singular reference herein including in the claims, such as “a” or “an” means “one or more”.

Throughout the description and claims of this specification, the words “comprise”, “including”, “having” and “contain” and variations of the words, for example “comprising” and “comprises” etc, mean “including but not limited to”, and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The use of any and all examples, or exemplary language (“for instance”, “such as”, “for example” and like language) provided herein, is intended merely to better illustrate the invention and does not indicate a limitation on the scope of the invention unless otherwise claimed. No language in the specification should be construed as indicating any non-claimed element as essential to the practice of the invention.

The invention claimed is:

1. A method of increasing ion throughput within an accumulator, an energy lift and a pulsed ion source, operated in that order upon a batch of ions, comprising the steps of:

(1) loading a batch of ions into the accumulator;

(2) changing the electrical potential of the energy lift to raise the potential energy of the batch of ions contained therein;

(3) ejecting the batch of ions from the pulsed ion source; and wherein one of the following conditions is satisfied:

(i) the energy lift is a separate device from the accumulator and the pulsed ion source, and concurrently with changing the electrical potential in step (2): a fresh batch of ions is loaded into the accumulator and/or a previous batch of ions is prepared for ejection in the pulsed ion source; or (ii) the energy lift is incorporated into the pulsed ion source and concurrently with changing the electrical potential in step (2) a fresh batch of ions is loaded into the accumulator; or (iii) the energy lift is incorporated into the accumulator and concurrently with changing the electrical potential in step (2) a previous batch of ions is prepared for ejection in the pulsed ion source, and wherein the accumulator is operated at a first electrical potential when the batch of ions is loaded into it, and the pulsed ion source is operated at a second potential when it receives ions, and wherein in step (2) the potential of the energy lift is changed by at least 1 kV from a potential at or similar to the first electrical potential to a potential at or similar to the second electrical potential.

2. A method of increasing ion throughput according to claim 1, wherein the preparation of the previous batch of ions for ejection comprises cooling the ions and/or compressing them.

3. A method of increasing ion throughput according to claim 1, wherein ions are fragmented within the accumulator.

4. A method of increasing ion throughput according to claim 1, wherein ions are cooled within the energy lift.

5. A method of increasing ion throughput according to claim 1, wherein the accumulator comprises one or more of: a multipole, a stack of rings, a funnel, and a cell comprising pixels.

6. A method of increasing ion throughput according to claim 1, wherein the energy lift comprises one or more of: a multipole, a stack of rings, a funnel, and a cell comprising pixels.

7. A method of increasing ion throughput according to claim 1, wherein the pulsed ion source comprises one or more of: a multipole, a stack of rings, a funnel, a cell comprising pixels, an ion trap, a 3-D quadrupole trap, an electrostatic trap, and a C trap.

8. A method of increasing ion throughput according to claim 1, wherein the method further comprises ionizing source material to produce ions, transporting at least some of the ions to the accumulator, receiving at least some of the ions ejected from the pulsed ion source in a mass analyzer, mass analyzing at least some of the received ions and detecting at least some of the mass analyzed ions.

9. A method of increasing ion throughput according to claim 8 wherein the method further comprises providing a mass spectrum derived from the detected ions.

10. A method of increasing ion throughput according to claim 1, wherein the second electrical potential is substantially at the potential required to impart the kinetic energy to the ions required for mass analysis.

11. A charged particle analyzer system comprising:

an accumulator electrically connected to a first power supply supplying a first electrical potential;

a pulsed ion source electrically connected to a second power supply supplying a second electrical potential, the first and second electrical potentials differing by at least 1 kV;

an energy lift electrically connected to a third power supply for lifting the energy of a batch of ions;

a controller connected to the third power supply and arranged to change the electrical potential of the third power supply from a potential similar to the first potential to a potential similar to the second potential while at least one of the following events is performed: a fresh batch of ions is entering the accumulator, or a previous batch of ions is being prepared for ejection in the pulsed ion source.

12. The charged particle analyzer system of claim 11 further comprising an ionizer, one or more charged particle transport systems, a mass analyzer and a detector.

13. The charged particle analyzer system of claim 11, wherein the preparation of the previous batch of ions for ejection comprises cooling and/or compressing the ions.

14. The charged particle analyzer system of claim 11, wherein the accumulator comprises one or more of: a multipole, a stack of rings, a funnel, and a cell comprising pixels.

15. The charged particle analyzer system of claim 11, wherein the energy lift comprises one or more of: a multipole, a stack of rings, a funnel, and a cell comprising pixels.

16. The charged particle analyzer system of claim 11, wherein the pulsed ion source comprises one or more of: a multipole, a stack of rings, a funnel, a cell comprising pixels, an ion trap, a 3-D quadrupole trap, an electrostatic trap, and a C trap.

* * * * *